United States Patent [19]
Grois et al.

[11] Patent Number: 5,155,900
[45] Date of Patent: Oct. 20, 1992

[54] HAND TOOL FOR ASSEMBLING A FIBER OPTIC CONNECTOR

[75] Inventors: Igor Grois, Lincolnwood; David Q. Feng, Skokie, both of Ill.

[73] Assignee: Molex Incorporated, Lisle, Ill.

[21] Appl. No.: 614,653

[22] Filed: Nov. 16, 1990

[51] Int. Cl.⁵ ............................................. B23P 19/04
[52] U.S. Cl. ........................................ 29/758; 29/760; 29/281.1; 269/296
[58] Field of Search ............. 29/758, 760, 278, 281.1; 269/289 R, 296; 81/13

[56] References Cited

U.S. PATENT DOCUMENTS

| | | | |
|---|---|---|---|
| 1,655,643 | 1/1928 | Rumsey | 29/278 |
| 4,562,632 | 1/1986 | Parchet et al. | 29/281.1 |

Primary Examiner—Roscoe V. Parker
Attorney, Agent, or Firm—A. A. Tirva; Stephen Z. Weiss

[57] ABSTRACT

A hand tool is provided for facilitating assembly of a fiber optic connector which includes a body, a forwardly projecting fiber ferrule and a backshell member. The tool includes a base with a forward upstanding portion for receiving and positioning the fiber ferrule and a rearward upstanding portion for receiving and positioning the connector body. The rearward upstanding portion forms a saddle for receiving the connector body, the saddle having a flat side for engaging a flat side of the connector body to prevent rotation thereof as the backshell member is threadably assembled thereto.

5 Claims, 1 Drawing Sheet

HAND TOOL FOR ASSEMBLING A FIBER OPTIC CONNECTOR

FIELD OF THE INVENTION

This invention generally relates to fiber optic connectors and, particularly, to a hand tool for assembling a fiber optic connector.

BACKGROUND OF THE INVENTION

Fiber optic connectors are used for terminating a fiber optic cable whereby a given length of the optical fiber is stripped of its cladding and exposed for insertion through a connector component, such as a ceramic, forwardly projecting ferrule. A tip of the fiber is exposed at a distal end of the ferrule for mating with the tip of another fiber from a complementary connector.

Many such fiber optic connectors are readily terminated and/or assembled to a fiber optic cable in a mass production or mass terminating environment. However, field termination of fiber optic cables in connectors often is extremely difficult because of the relatively small size of the connectors in relation to a person's hands and fingers.

One example of such a fiber optic connector is shown in U.S. Pat. No. 5,062,683, issued Nov. 5, 1991. The fiber optic connector of that application is a strain relief connector wherein an internally threaded sleeve or backshell member is threadable onto the back end of an externally threaded connector body having a ceramic ferrule projecting from the front end thereof. Fine strength strands of the fiber optic cable are clamped between the internal and external threads of the backshell member and connector body, respectively, to provide strain relief on the cable. The overall connector is very small for a person to grip, in relation to the forces necessary person to grip, in relation to the forces necessary to thread the backshell member over the strength strands and clamp the strands between the threads of the two connector components.

This invention is directed to providing a tool for use by an operator in order to retain components of the connector while an operator manipulates other components of the connector, particularly for field termination in the fiber optic connector art.

SUMMARY OF THE INVENTION

An object, therefore, of the invention is to provide a hand tool for facilitating assembly of a fiber optic connector.

As disclosed herein, a fiber optic connector is shown to include a body, a forwardly projecting fiber ferrule through which an exposed optical fiber protrudes, a backshell member for assembling onto a rear end of the connector body and a mating ring surrounding the connector body for mating the connector with a complementary fiber optic connector.

Generally, the hand tool includes a base, and means are provided upstanding from the base for receiving and positioning the connector body and the fiber ferrule. Complementary interengaging means are provided between the connector body and the upstanding means for preventing rotation of the connector body so that the backshell member can be threadably assembled to the body.

More particularly, the upstanding means for receiving and positioning the connector body and the fiber ferrule are provided by a forward portion defining a saddle for positioning the fiber ferrule, and a rearward portion in the form of a saddle for positioning the connector body. The forward and rearward portions are sufficiently spaced above the base and are sufficiently spaced apart to accommodate the mating ring of the connector therebetween.

The connector body includes at least one flat side. The means for preventing rotation of the connector body is provided by at least one flat side of the saddle formed by the rearward portion of the upstanding means, the flat sides being engageable to prevent rotation of the connector body relative to the tool which is large enough to be readily graspable by a user.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the following description taken in conjunction with the accompanying drawings, in which like reference numerals identify like elements in the figures and in which:

DETAILED DESCRIPTION OF THE PREFERRED EMBODIMENT

Figure 1:
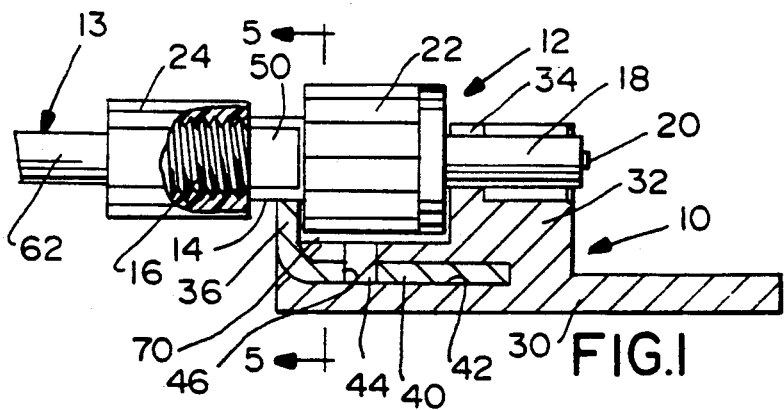
FIG. 1 is a vertical, central section through the hand tool of the invention, with a fiber optic connector positioned thereon.

Referring to the drawings in greater detail, a hand tool, generally designated 10, is designed for facilitating assembly of a fiber optic connector, generally designated 12 and terminating a fiber optic cable 13. Connector 12 is of the type shown in the aforementioned patent application which is incorporated herein by reference.

Suffice it to say, connector 12 includes a body 14 having a rear, externally threaded back end 16, with a forwardly projecting fiber ferrule 18 through which an exposed optical fiber 20, stripped of its cladding, protrudes. An internally threaded mating ring or nut 22 surrounds body 14, for mating the connector with an appropriate complementary fiber optic connector (not shown). An internally threaded backshell member 24 is threadable onto externally threaded back end 16 of body 14 to clamp fine strength strands of the fiber optic cable between the internal and external threads to provide strain relief on the cable. Other details of the connector and its operation and function can be derived from the aforesaid patent application which is incorporated herein by reference Hand tool 10, generally, provides means for receiving and positioning fiber optic connector 12 and preventing rotation thereof to facilitate assembly of the connector. Actually, the tool nonrotatably receives and positions body 14 and ferrule 18 so that backshell member 24 readily can be threaded onto back end 16 of the body.

Figure 3:
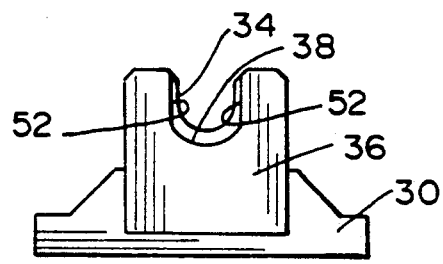
FIG. 3 is an elevational view of the rear or left-hand end of the hand tool as viewed in FIG. 1.
Figure 4:
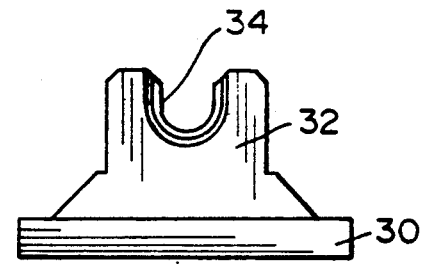
FIG. 4 is a an elevational view of the front.
Figure 5:
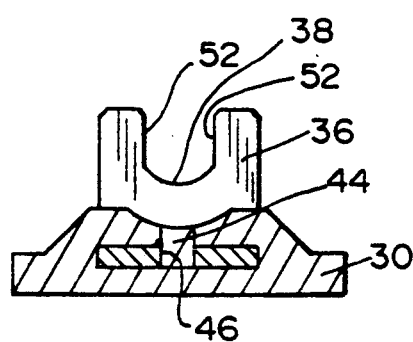
FIG. 5 is a vertical section taken generally along line 5—5 of FIG. 1.

More particularly, hand tool 10 includes a base 30 having a forward upstanding portion 32 which defines a saddle 34 (FIG. 4) for receiving and positioning fiber ferrule 18. A rearward upstanding portion 36 defines a saddle 38 (FIG. 3) for receiving and positioning connector body 14.

The hand tool can be fabricated of a unitary construction or of multiple components within the concepts of the invention. The tool can be fabricated of a variety of materials, such as plastic, metal or the like. For molding purposes, the tool 10 shown herein is fabricated of two parts. One part is unitarily molded of plastic material and defines base 30 and forward upstanding portion 32 which forms saddle 34. A second part 40 is generally L-shaped and has an upstanding leg forming rearward upstanding portion 36 which defines saddle 38. The other or horizontal leg of the L-shaped part 40 is positioned in a slot 42 formed in base 30 of the first part. A rivet means 44 secures the parts together and extends through a hole 46 in the horizontal leg.

Generally, complementary interengaging means are provided between connector body 14 and rearward portion 36 of the upstanding positioning means for preventing rotation of the connector body so that backshell member 24 can be threadably assembled to the body. More particularly, opposite sides of the connector body are flattened, as at 50. Complementarily, opposite sides of saddle 38 are flattened, as at 52, for engaging the flattened sides of the body. Therefore, the body is non-rotatably received and positioned on the tool.

Figure 2:
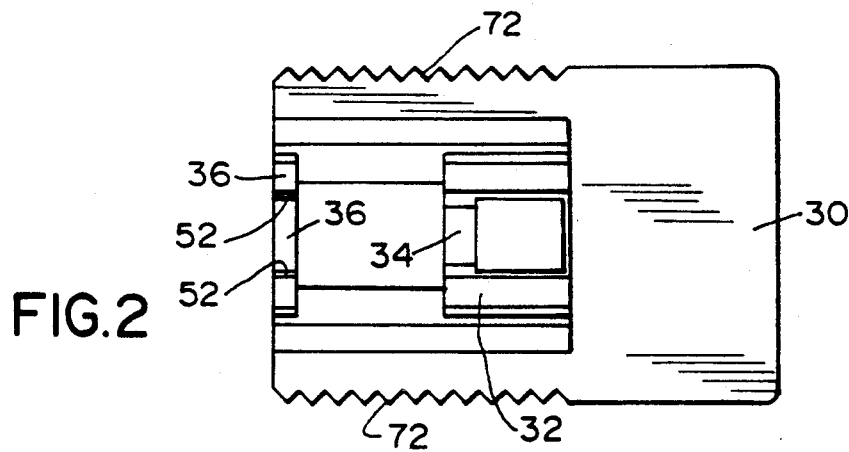
FIG. 2 is a top plan view of the hand tool.

In use, fiber optic cable 13 has its outer covering 62 removed to expose its fine strength strands 64 (not shown but described in the aforesaid application). A cladded portion of the optical fiber extends at least partially into body portion 14, and an exposed length of the optical fiber (i.e., stripped of its cladding) extends through fiber ferrule 18 with a tip of the fiber exposed at the distal end of the ferrule, as at 20. Connector body 14 (and mating ring 12) and fiber ferrule 18, with the fiber optic cable assembled therein as described, are positioned into hand tool 12 as shown in FIG. 1 It can be seen that forward upstanding portion 32 and rearward upstanding portion 36 are spaced sufficiently apart, with their respective saddles 34 and 36 sufficiently spaced above body 30, so that mating ring 22 can be accommodated in a space 70 therebetween. The sides of the body are serrated, as at 72 (FIG. 2), so that a user easily can grasp the tool which is considerably larger than the fiber optic connector components. The user then grasps backshell member 24 and threads the backshell member onto back end 16 of connector body 14, clamping the strength strands therebetween with considerable force, and the tool preventing rotation of the connector body. Without the tool, it would be extremely difficult to manipulate the connector components and to threadably engage the components.

It will be understood that the invention may be embodied in other specific forms without departing from the spirit or central characteristics thereof The present examples and embodiments, therefore, are to be considered in all respects as illustrative and not restrictive, and the invention is not to be limited to the details given herein.

We claim:

1. A hand held tool or facilitating assembly of a fiber optic connector which includes a body, a forwardly projecting fiber ferrule and a backshell member, comprising:

a base;

means upstanding from the base including a rearward and a forward portion for receiving and positioning the connector body and the fiber ferrule, respectively; and complementary interengaging means between the connector body and the rearward portion for preventing rotation of the connector body so that the backshell member can be threadably assembled to the body wherein the connector body includes at least one flat side, and said rearward portion comprises a saddle for receiving the connector body, the saddle having at least one flat side for engaging the flat side of the connector body and preventing rotation thereof.

2. The hand tool of claim 1 wherein said forward and rearward portions of the upstanding means are sufficiently spaced above the base and sufficiently spaced apart to accommodate therebetween a mating ring of the connector surrounding the connector body portion.

3. A hand held tool for facilitating assembly of a fiber optic connector which includes a body, a forwardly projecting fiber ferrule and a backshell member, comprising:

a base;

means upstanding from the base including a rearward and a forward portion for receiving and positioning the connector body and the fiber ferrule, respectively; and complementary interengaging means between the connector body and the rearward portion for preventing rotation of the connector body so that the backshell member can be threadably assembled to the body wherein said rearward portion comprises a saddle for receiving the fiber ferrule.

4. A hand tool for facilitating assembly of a fiber optic connector which includes a body, a forwardly projecting fiber ferrule and a backshell member, comprising:

a base;

a forward portion upstanding from the base and including a saddle for receiving and positioning the fiber ferrule; and a rearward portion upstanding from the base and defining a saddle for receiving and positioning the connector body, at least one side of the saddle of the rearward portion being flattened for engaging a complementary flattened side of the connector body to prevent rotation of the body so that the backshell member can be threadably assembled to the body.

5. The hand tool of claim 4 wherein said forward and rearward portions of the upstanding means are sufficiently spaced above the base and sufficiently spaced apart to accommodate therebetween a mating ring of the connector surrounding the connector body portion.

* * * * *